UNITED STATES PATENT OFFICE 2,744,826
Patented May 8, 1956

2,744,826

FLOUR COMPOSITION

Jerome B. Thompson and Bruce D. Buddemeyer, Kansas City, Mo., assignors to C. J. Patterson Company, a corporation of Missouri No Drawing. Application February 8, 1954,
Serial No. 409,058

15 Claims. (Cl. 99—93)

The present invention relates to improved flour or farinaceous compositions and especially to wheat flour compositions.

It is the object of this invention to provide an improved flour composition to be used in lieu of ordinary flour in the preparation of baked food products and which has increased tolerances to variations and abuses in mixing and handling to which flour doughs or batters are subjected and which will yield an improved baked product.

A further object is to provide a flour composition in which the mixing characteristics are relatively constant and in which the variation in mixing requirements inherent in ordinary flour are minimized or eliminated and which, therefore, will permit a simplified and more uniform production of prepared mixes and finally baked products.

Still another object is to provide a flour improved in baking quality without being subjected to oxidizing agents which destroy nutrients naturally present in flour and which leave unknown reaction products and residues.

The purposes of this invention are accomplished by blending with a flour a small proportion of one or more of the compounds known as acyl lactylates having the following chemical formula:

$$RCO(OCHCH_3CO)_nOX$$

In this formula RCO is the acyl radical of one of the acyclic acids known as fatty acids containing 16 to 24 carbon atoms and particularly those of palmitic, stearic, and arachidic acids. The $(n)$ indicates the number of lactyl groups in these compounds and may vary on the average from 1 to 4: the (X) is a cation and can be hydrogen or other non-toxic cation. Acyl lactylates of this type have been described in our copending application S. N. 261,382, filed December 12, 1951. In the production of these compounds, mixtures of fatty acid lactylates containing varying numbers of lactyl groups are usually produced. These mixtures, as long as the average number of lactyl groups contained therein falls within the range indicated, can be employed directly in the compositions according to the invention.

The acyl lactylic acids themselves are satisfactory functionally in this flour composition but are rather sticky and intractable plastics which do not blend well with flour. Also, as the number of lactyl groups increases, the melting points of both the acids themselves and those of their salts are depressed. For these reasons the alkali metal or alkaline earth metal salts of the acyl lactylic acids containing from 1 to 3 lactyl groups on the average ($n=1-3$) are preferred.

These salts are white or light colored powders which blend invisibly with flour and can be added to it in the requisite amounts directly into the mill stream.

With ordinary flours, as little as .1% of the fatty acid lactylates may suffice to accomplish the objects of the invention and no flours with normal proteins have been found which require more than 1% of the fatty acid lactylates. In general, cake flour compositions with their lower protein content require about this maximum amount. General purpose flours require about .5% and the strong bread flours somewhat less.

The salts which are satisfactory can be those of any of the alkali and alkaline earth metals but the sodium and calcium salts are preferred. The sodium salts are soluble and somewhat more positive in their action than the calcium salts, but they also tend to be hygroscopic. The calcium salts have the advantage of enriching the composition with this element and, therefore, serve this additional nutritional function.

Wheat flours are unique in that doughs made from them contain a resilient, hydrated protein colloid called gluten. It is the peculiar characteristics of this gluten colloid which make possible the typical yeast leavened baked products made from wheat flour. The function of the gluten colloid in batter type products is less well understood but that it is necessary is illustrated by the fact that flour and not starch alone must be used.

Wheat flours and the gluten they contain are extremely variable as to baking quality since their properties depend not only on the wheat variety and even species from which they are derived, but also upon the soil and climatic conditions under which the wheat was grown.

Because of the variability and often poor baking quality of flours, it is customary to treat them with flour "improvers." At the present state of the art, these improvers are oxidizing agents. Some of the materials which are, or have been, used are nitrogen trichloride, nitrogen peroxide, benzoyl peroxide, chlorine dioxide, and persulfate or bromate salts.

The action of these materials is dependent upon their destruction or inhibition of proteases and the resultant sparing of the gluten protein from hydrolysis, and through the formation of cross linkages between protein molecules which in effect increases their size. The improvement is due to chemical changes in the flour and is accompanied by the bleaching of carotinoids which may form Vitamin A and possibly the destruction of other flour nutrients.

In the case of nitrogen trichloride and benzoyl peroxide, reaction products and residues of undesirable nature are known to exist in the flour and possibly they result from the other oxidizing agents also.

The improved flour composition of this invention can employ either bleached or unbleached flour and is of better baking quality than either. The fatty acid lactylates are quite different in action from oxidizing agents. While the latter cause an actual chemical modification of flour constituents and leave products rather imperfectly known, the action of the acyl lactylates is due to a physical improvement of the colloidal properties of the flour in a dough through absorption upon the flour components and especially the gluten. That it may be recovered from the flour unchanged by extraction techniques would indicate that it causes no chemical alteration of natural flour constituents or destruction of nutrients.

The mixing characteristics of a flour and the quality of the baked products obtained from it are determined to a very large extent by the colloidal properties of the proteinaceous component. An instrument called the Farinograph is employed to determine what these characteristics are and the data obtained by its use have been demonstrated to correlate with the conditions which must prevail in a bakery if products of optimum quality are to be obtained. This is well established for yeast leavened products, and the data obtained have also been used to predict the performance of flour in batters but the exactitude of correlation is not so well established.

The Farinograph is essentially a miniature, low speed, recording mixer and provides three measurements on a flour which are of value in establishing the characteristics of the flour, predicting its baking performance and permitting procedural alterations to allow for the variabilities. By placing a specified amount of flour in the bowl and titrating, the amount of water required to give a paste of standard consistency is determined. This titration figure, called absorption, will vary from 50 to 65% for normal flours. A time value, called mixing time or peak time, is indicated by the time required to develop the gluten colloid in the paste and to reach a standard maximum viscosity with mixing. The instrument also provides a measure of the tolerance which the flour has to under- or over-mixing. This measure, called mixing tolerance index or MTI, is the change in paste viscosity in the units of measure caused by breakdown or dispersion of the gluten colloid five minutes after the maximum or peak viscosity is reached. The MTI is a reciprocal function of tolerance to mixing and handling: tolerance increases as MTI decreases.

These Farinograph data are of value to the baker in establishing mixing time and absorption optimums for a flour used in making yeast leavened products, but the action of the high speed commercial mixers is such that actual attainment of an optimum mix is very difficult and some tolerance in this respect is very important. In baking practice the flour used in this kind of product is a strong flour, with high gluten content, usually somewhat more than 10%. Flours with a low MTI are desirable; one with an MTI of 40-50 will lead to production difficulties because it lacks tolerance. Flours with an MTI over 50 will be rejected by many bakers.

Confectioners flours of the types used in cakes, cookies, pie doughs, doughnuts, and the like, usually are of finer granulation and more highly bleached. They are made from soft wheats of widely varying types but, in general, have a protein content of about 8% and this of a weak or very extensible type. If the protein is too high, the baker expects a batter product such as cakes to be of tough consistency, although the flour might make fine cookies. Taking into account the protein content required to give a particular batter product, the more extensible the gluten, the better the product. The tolerance measurement provided by the Farinograph is correlated with extensibility, which will determine the cellular crumb structure and eating quality of the finished product.

The Farinograph data from a series of ordinary flours of several types are presented below for illustrative purposes.

| Sample No. | Flour Type | Protein, Percent | Absorption, Percent | Mixing Time (min.) | MTI |
|---|---|---|---|---|---|
| 1 | Illinois Cake | 7.6 | 52.6 | 2.0 | 110 |
| 2 | West Coast Pastry | 8.4 | 51.5 | 2.0 | 65 |
| 3 | Nebraska Bakers | 10.3 | 58.0 | 6.0 | 45 |
| 4 | Montana Bakers | 11.5 | 65.0 | 5.0 | 45 |
| 5 | Kansas Bakers | 11.2 | 59.6 | 6.0 | 55 |
| 6 | Minnesota Bakers | 12.6 | 63.4 | 9.0 | 25 |
| 7 | Kansas Bakers | 11.0 | 60.5 | 5.5 | 45 |
| 8 | Spring Clear | 14.0 | 65.7 | 7.5 | 25 |
| 9 | do | 15.1 | 64.6 | 10.0 | 30 |
| 10 | Kansas Bakers | 11.2 | 59.9 | 6.5 | 40 |

Sample No. 1 is a typical cake flour made from soft red wheat; sample No. 2 is a white wheat flour which finds use in cookies, pastries, and some cakes. Sample No. 2 also would be satisfactory for general household use. The others are representative of the high protein, hard red wheat flours used by bakers. Of these latter, sample No. 5 would be difficult to use in a commercial bakery and several of the others would be marginal as to acceptability.

To illustrate the effects of the addition of acyl lactylates, flour compositions were made using these same flours into which .5% of a calcium stearyl-2 lactylate (the 2 referring to the average number of lactyl groups present in the product) had been blended. The results obtained using these materials in the Farinograph are summarized below.

| Sample No. | Absorption, Percent | Mixing Time | MTI |
|---|---|---|---|
| 1 | 52.8 | 4.0 | 80 |
| 2 | 51.3 | 5.5 | 30 |
| 3 | 57.7 | 7.0 | 25 |
| 4 | 64.4 | 5.5 | 25 |
| 5 | 59.6 | 6.0 | 30 |
| 6 | 62.8 | 9.0 | 15 |
| 7 | 60.0 | 8.0 | 20 |
| 8 | 64.2 | 9.0 | 5 |
| 9 | 64.0 | 10.0 | 20 |
| 10 | 59.9 | 7.0 | 30 |

It will be noted that the absorptions of the flour compositions are not materially different from the flours from which they were prepared. The mixing times have been increased slightly, especially in cases where they were abnormally short, and are within controllable ranges. The MTI has been decreased markedly. The tolerance of the compositions and the extensibility of their glutens are decidedly greater than that of the original flours.

The tolerances of the bakers flour compositions are much higher and they all could be used without difficulties in a commercial bakery. The variability in this respect is less for the composition than for the original flours and it is possible to further decrease the variability of tolerance and, to a leser extent, that of mixing time also, by increasing or decreasing the amount of fatty acid lactylate or by changing the type of fatty acid lactylate.

To illustrate the effect of the addition of the acyl lactylates to specialty flours the Farinograph data from whole wheat and durum semolina flours with and without addition of 0.75% of sodium-stearyl-2-lactylate are given below:

| | Absorption, Percent | Mixing Time (min.) | MTI |
|---|---|---|---|
| 100% Whole Wheat | 100 | 5.5 | 15 |
| +0.75% Na-Stearyl-2-Lactylate | 100 | 12.5 | 5 |
| Durum Semolina | 58 | 4.0 | 45 |
| +0.75% Na-Stearyl-2-Lactylate | 58 | 6.5 | 20 |

The amount of acyl lactylate required to provide equivalent or maximum tolerances to mixing and handling for flours with the usual protein contents for specific purposes varies from as little as .1% to about 1%. High protein flours normally never have an MTI of over 65 and these can be made sufficiently uncritical for general use by blending in about .5% of one of the acyl lactylates. Larger amounts are required to obtain the maximum benefits for low protein flours, but using the Farinograph and final usages as criteria, over 1% is never required.

Preparations of the flour compositions with different levels of sodium stearyl-2 lactylate have been made and their mixing times and tolerances determined to illustrate the range in which the effects of the added acyl lactylates are most beneficial. The data from the Farinograms, presented below, indicate that maximum tolerances were obtained at about .75%. A further increase of mixing time was obtained with 1% of the sodium stearyl-2 lactylate with no improvement in tolerances. Increased mixing time without tolerance is not desired, so the level of sodium stearyl-2 lactylate best for this flour composition would be between .25% and .75%.

| Composition | Absorption | Mixing Time | MTI |
|---|---|---|---|
| Control Flour | 62.0 | 6.5 | 45 |
| +.10% Sodium Stearyl-2 Lactylate | 62.0 | 7.5 | 35 |
| +.25% Sodium Stearyl-2 Lactylate | 61.8 | 8.5 | 30 |
| +.75% Sodium Stearyl-2 Lactylate | 61.4 | 12.5 | 20 |
| +1.00% Sodium Stearyl-2 Lactylate | 61.5 | 14.0 | 20 |

The amount of acyl lactylate required to give the best flour composition from a given flour is established in this fashion, and although it is conceivable, no normal flour has been found which requires more than 1%. While the amount of the acyl lactylate used is not critical, maximum benefits and the most economical composition result from predetermining the amount which fits the flour.

The fatty acid portion of the acyl lactylate is preferably that of a saturated fatty acid containing from 16 to 20 carbon atoms. Compounds having less than 16 do not function; those above 20 are difficult to obtain. The average number of lactyl groups is preferably 1 to 3. Above four, they increase mixing time but have relatively little effect on mixing tolerances. It is seldom that increased mixing time without tolerance would be desirable. The primary effect of the cations is upon the physical properties of the acyl lactylate itself. The alkali metal cations, such as sodium, make a more soluble and slightly more effective composition and are desirable in the lower protein flours for this reason. The following table indicates the general effectiveness of the types of acyl lactylates found most desirable for producing the flour composition.

| Sample | MTI | Mixing Time |
|---|---|---|
| Control Flour | 40 | 6.0 |
| +.5% Calcium Palmityl-3 Lactylate | 35 | 9.5 |
| +.5% Calcium Arachidyl-2 Lactylate | 20 | 8.0 |
| +.5% Potassium Stearyl-2 Lactylate | 20 | 9.5 |
| +.5% Sodium Stearyl-1 Lactylate | 25 | 7.0 |
| +.5% Sodium Arachidyl-3 Lactylate | 15 | 10.0 |
| +.5% Stearyl-2 Lactylic Acid | 30 | 7.0 |

In preparing the flour composition, the requisite amount of the fatty acid lactylate powder can be blended with ordinary flour by batch process and even by the user with the aid of an efficient stirrer. Generally a more uniform blend and better results are obtained if the fatty acid lactylate is fed in the proper quantities directly into the flour in the mill by known methods. Of course, if desired, flour can be preblended with larger quantities of the fatty acyl lactylate than required in the desired flour composition for baking uses, and then blending this preblend with further quantities of flour. If the sticky acyl lactylic acids themselves are employed, they may be melted and preblended with about 5 parts of flour to give a powder which can then be easily blended with further quantities of flour to give the desired final composition.

The flour compositions according to the invention are essentially dry and free flowing and can be made as described using any of the general or specialty flours. The compositions so made will yield, by ordinary procedures, superior cakes, rolls, doughnuts, biscuits, pancakes, pastries, and breads, and are used advantageously in lieu of ordinary flours directly or in prepared mixes for these products.

The present application is a continuation-in-part of our copending application S. N. 261,382, filed December 12, 1951.

We claim:

1. A composition of matter comprising flour in intimate admixture with a fatty acid lactylate composition of the formula $$RCO(OCHCH_3CO)_nOX$$

wherein RCO is an acyl radical of a fatty acid containing from 16 to 24 carbon atoms, $n$ is a number of from 1 to 4 and X is a non-toxic cation.

2. A composition of matter comprising flour in intimate admixture with a relatively small quantity of a fatty acid lactylate composition of the formula $$RCO(OCHCH_3CO)_nOX$$

wherein RCO is an acyl radical of a fatty acid containing from 16 to 24 carbon atoms, $n$ is a number of from 1 to 4 and X is a non-toxic cation.

3. A composition of matter comprising a wheat flour in intimate admixture with a relatively small quantity of a fatty acid lactylate composition of the formula $$RCO(OCHCH_3CO)_nOX$$

wherein RCO is an acyl radical of a fatty acid containing from 16 to 24 carbon atoms, $n$ is a number of from 1 to 4 and X is a non-toxic cation.

4. A composition of matter according to claim 3 in which $n$ is a number from 1 to 3 and the fatty acid acyl radical is that of a saturated fatty acid and contains 16 to 20 carbon atoms.

5. A composition of matter according to claim 4 in which the quantity of fatty acid lactylate in said admixture is about 0.1% to 1.0% by weight of the flour.

6. A composition of matter according to claim 4 in which the quantity of fatty acid lactylate in said admixture is about 0.5% by weight of the flour.

7. A composition of matter according to claim 4 in which $n$ is about 2.

8. A composition of matter according to claim 4 in which X is an alkali metal cation.

9. A composition of matter according to claim 4 in which X is sodium.

10. A composition of matter according to claim 4 in which X is an alkaline earth metal cation.

11. A composition of matter according to claim 4 in which X is calcium.

12. A composition of matter according to claim 4 in which the fatty acid radical is a stearyl radical and X is sodium.

13. A composition of matter according to claim 4 in which the fatty acid radical is a stearyl radical and X is calcium.

14. A composition of matter according to claim 4 in which the fatty acid radical is a stearyl radical, X is sodium and the quantity of the sodium stearyl lactylate in said admixtures is about 0.1% to 1.0% by weight of the flour.

15. A composition of matter according to claim 4 in which the fatty acid radical is a stearyl radical, X is calcium and the quantity of the calcium stearyl lactylate in said admixtures is about 0.1% to 1.0% by weight of the flour.

References Cited in the file of this patent

UNITED STATES PATENTS

| 1,560,045 | Dunlap | Nov. 3, 1925 |
| 2,132,394 | Coith et al. | Oct. 11, 1938 |
| 2,132,436 | Reynolds et al. | Oct. 11, 1938 |
| 2,449,990 | Gresham et al. | Sept. 28, 1948 |
| 2,602,748 | Hansen | July 8, 1952 |
| 2,690,971 | Iveson et al. | Oct. 5, 1954 |